(12) United States Patent
Patwardhan et al.

(10) Patent No.: US 10,878,673 B2
(45) Date of Patent: Dec. 29, 2020

(54) ADAPTERS FOR OBTAINING OPERATIONAL DATA FROM CIRCUIT BREAKERS AND RELATED SYSTEMS AND METHODS

(71) Applicant: Eaton Intelligent Power Limited, Dublin (IE)

(72) Inventors: Sujit Subhash Patwardhan, Pune (IN); Jason Kohei Okerman, Pittsburgh, PA (US); Nicholas David Reynolds, Monroeville, PA (US)

(73) Assignee: Eaton Intelligent Power Limited, Dublin (IE)

( * ) Notice: Subject to any disclaimer, the term of this patent is extended or adjusted under 35 U.S.C. 154(b) by 412 days.

(21) Appl. No.: 15/903,470

(22) Filed: Feb. 23, 2018

(65) Prior Publication Data
US 2019/0266856 A1 Aug. 29, 2019

(51) Int. Cl.
| | |
|---|---|
| *H01H 73/12* | (2006.01) |
| *G08B 5/36* | (2006.01) |
| *H02H 3/00* | (2006.01) |
| *H01H 71/04* | (2006.01) |
| *H01H 71/12* | (2006.01) |
| *H01H 9/02* | (2006.01) |

(52) U.S. Cl.
CPC .............. *G08B 5/36* (2013.01); *H01H 73/12* (2013.01); *H02H 3/00* (2013.01); *H01H 9/02* (2013.01); *H01H 71/04* (2013.01); *H01H 71/12* (2013.01); *H01H 71/125* (2013.01)

(58) Field of Classification Search
USPC ..................................... 361/42–50
See application file for complete search history.

(56) References Cited

U.S. PATENT DOCUMENTS

| | | | | |
|---|---|---|---|---|
| 5,706,153 | A * | 1/1998 | Innes | H02H 3/006 361/31 |
| 6,784,770 | B2 | 8/2004 | Gimenez et al. | |
| 7,436,641 | B2 * | 10/2008 | Holley | H01H 9/168 361/64 |
| 7,936,547 | B2 * | 5/2011 | Dougherty | H01H 71/7409 361/115 |
| 8,358,188 | B2 * | 1/2013 | Bellotto | H01H 71/7409 335/202 |
| 2006/0176630 | A1 * | 8/2006 | Carlino | H02H 1/0061 361/64 |
| 2009/0140871 | A1 | 6/2009 | Titus | |
| 2014/0085922 | A1 * | 3/2014 | Padro | F21V 23/0464 362/555 |
| 2016/0139192 | A1 | 5/2016 | Okerman et al. | |
| 2017/0184674 | A1 | 6/2017 | Okerman | |

* cited by examiner

*Primary Examiner* — Danny Nguyen
(74) *Attorney, Agent, or Firm* — Myers Bigel, P.A.

(57) ABSTRACT

A system includes a circuit breaker and an adapter. The circuit breaker includes a front face with a light source on the front face. The adapter is configured to be releasably held on the front face in an installed position. The adapter includes a light sensor that aligns with the light source in the installed position. The light source and the light sensor are configured to communicate such that the adapter receives operational data from the circuit breaker in the installed position.

20 Claims, 15 Drawing Sheets

ADAPTERS FOR OBTAINING OPERATIONAL DATA FROM CIRCUIT BREAKERS AND RELATED SYSTEMS AND METHODS

BACKGROUND

The current process for gathering data from a circuit breaker in the field is to go to a problem site with both a technician and an electrician. The electrician removes the problem breaker which is then sent back to the breaker manufacturer. Upon arrival, the breaker is typically taken apart and the memory is read, and then the unit is scrapped.

SUMMARY

Some embodiments of the invention are directed to a system including a circuit breaker and an adapter. The circuit breaker includes a front face with a light source on the front face. The adapter is configured to be releasably held on the front face in an installed position. The adapter includes a light sensor. The light source and the light sensor are configured to communicate such that the adapter receives operational data from the circuit breaker in the installed position.

In some embodiments, the adapter includes a housing having a front portion and a rear portion. The rear portion may include first and second spaced apart side rails that are configured to engage first and second side surfaces of the front face to hold the adapter in the installed position optionally with a friction fit.

The rear portion of the adapter housing may include a lower rail that is configured to engage a lower surface of the front face in the installed position. The first and second side rails and the first and second side surfaces may cooperate to align the adapter and the front face in a first direction. The lower rail and the lower surface may cooperate to align the adapter and the front face in a second direction that is orthogonal to the first direction.

In some embodiments, the light sensor is aligned with the light source in the installed position. The first and second side rails and the first and second side surfaces may cooperate to align the light sensor and the light source in a first direction. The lower rail and the lower surface may cooperate to align the light sensor and the light source in a second direction that is orthogonal to the first direction.

In some embodiments, the rear portion of the adapter housing includes an upper rail that is configured to engage the front face in the installed position. The first and second side rails, the lower rail, and/or the upper rail may be configured to block ambient light with the adapter in the installed position.

In some embodiments, the circuit breaker includes a test button that protrudes from or is substantially flush with the front face. The adapter may be configured to actuate the test button when the adapter is in the installed position. The adapter may include an actuator including a first actuator portion that is configured to extend through and protrude from the front portion of the adapter housing and a second actuator portion that is configured to extend through and protrude from the rear portion of the adapter housing. The second actuator portion may be configured to actuate the test button in response to a user actuating the first actuator portion. The first actuator portion may be on a first side of a printed circuit board and the second actuator portion may be on a second, opposite side of the printed circuit board.

The printed circuit board may be optionally movably disposed in an interior cavity defined by the adapter housing.

In some embodiments, the circuit breaker is one of a plurality of circuit breakers held in an enclosure. When the adapter is in the installed position on the circuit breaker, the adapter may be sized to not interfere with the functionality of any other one of the plurality circuit breakers.

In some embodiments, the system includes an electronic device in communication with the adapter and configured to receive the operational data from the adapter. The electronic device may be configured to wirelessly receive the operational data from the adapter. The electronic device may include a display device configured to display the operational data.

Some other embodiments of the invention are directed to a method including: installing an adapter on a circuit breaker in an installed position with the adapter held on the circuit breaker optionally with a friction fit; aligning a light source of the circuit breaker with a light sensor of the adapter in response to installing an adapter on a circuit breaker in the installed position; and receiving operational data of the circuit breaker at the adapter by receiving a light signal emitted by the light source with the light sensor.

In some embodiments, the adapter includes a housing having front and rear portions and first and second spaced apart side rails at the rear portion. Installing the adapter on the circuit breaker in the installed position may include receiving a front face of the circuit breaker between the first and second side rails such that the first side rail engages a first side surface of the front face and the second side rail engages a second side surface of the front face.

In some embodiments, the adapter includes a lower rail at the rear portion that is perpendicular to the first and second side rails. Installing the adapter on the circuit breaker in the installed position may include engaging a lower surface of the front face with the lower rail.

In some embodiments, the method includes: aligning the adapter in a first direction in the installed position using the first and second side rails; and/or aligning the adapter in a second, perpendicular direction in the installed position using the lower rail.

In some embodiments, the adapter includes an upper rail at the rear portion that is perpendicular to the first and second side rails. Installing the adapter on the circuit breaker in the installed position may include engaging the front face with the upper rail. The method may include blocking ambient light with the adapter in the installed position using the first side rail, the second side rail, the lower rail, and/or the upper rail.

In some embodiments, circuit breaker includes a test button on the front face. The method may include actuating the test button with the adapter in the installed position.

Some other embodiments of the invention are directed to an adapter for receiving operational data from a circuit breaker. The adapter includes a housing having a front portion and a rear portion, the rear portion including first and second spaced apart side rails that are configured to engage first and second sides of the circuit breaker or first and second side surfaces of a front face of the circuit breaker to hold the adapter in an installed position on the circuit breaker optionally with a friction fit. The adapter is configured to communicate with the circuit breaker to receive operational data from the circuit breaker in the installed position.

In some embodiments, the adapter is configured to wirelessly communicate the operational data to an electronic device.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
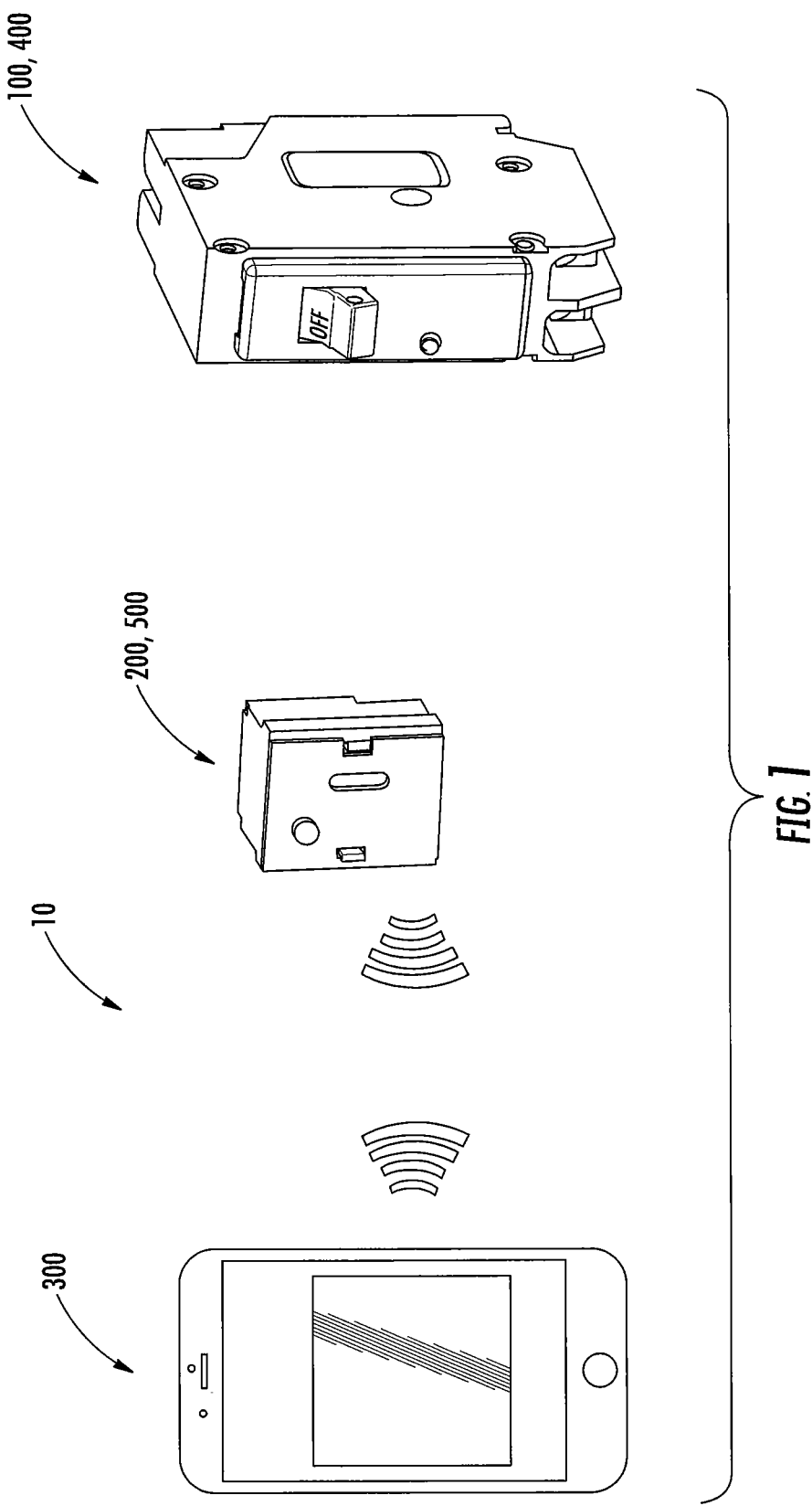
FIG. 1 illustrates a system for obtaining operational data from a circuit breaker according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A system 10 for obtaining operational data from a circuit breaker is shown in FIG. 1. The system 10 includes a circuit breaker 100 and an adapter 200. The system 10 may further include an electronic device 300 that communicates with the adapter 200.

Figure 10:
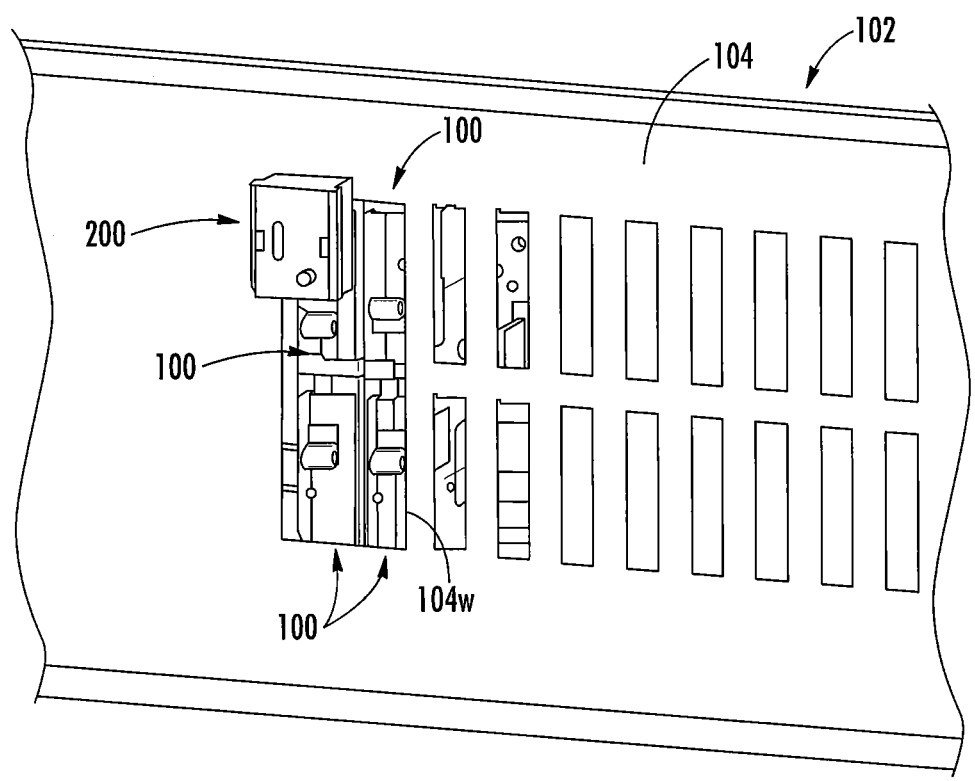
FIG. 10 is a fragmentary perspective view of an enclosure holding a plurality of circuit breakers and the adapter of FIG. 3 installed on only one of the circuit breakers in an installed position.

The circuit breaker 100 may be a residential miniature circuit breaker. Referring to FIG. 10, a plurality of the circuit breakers 100 may be held in an enclosure 102. The enclosure 102 may include a front panel or dead front 104. The front panel or dead front 104 may include access windows 104w. The system 10 (FIG. 1) may include the plurality of circuit breakers 100 and/or the enclosure 102 in some embodiments.

Figure 2:
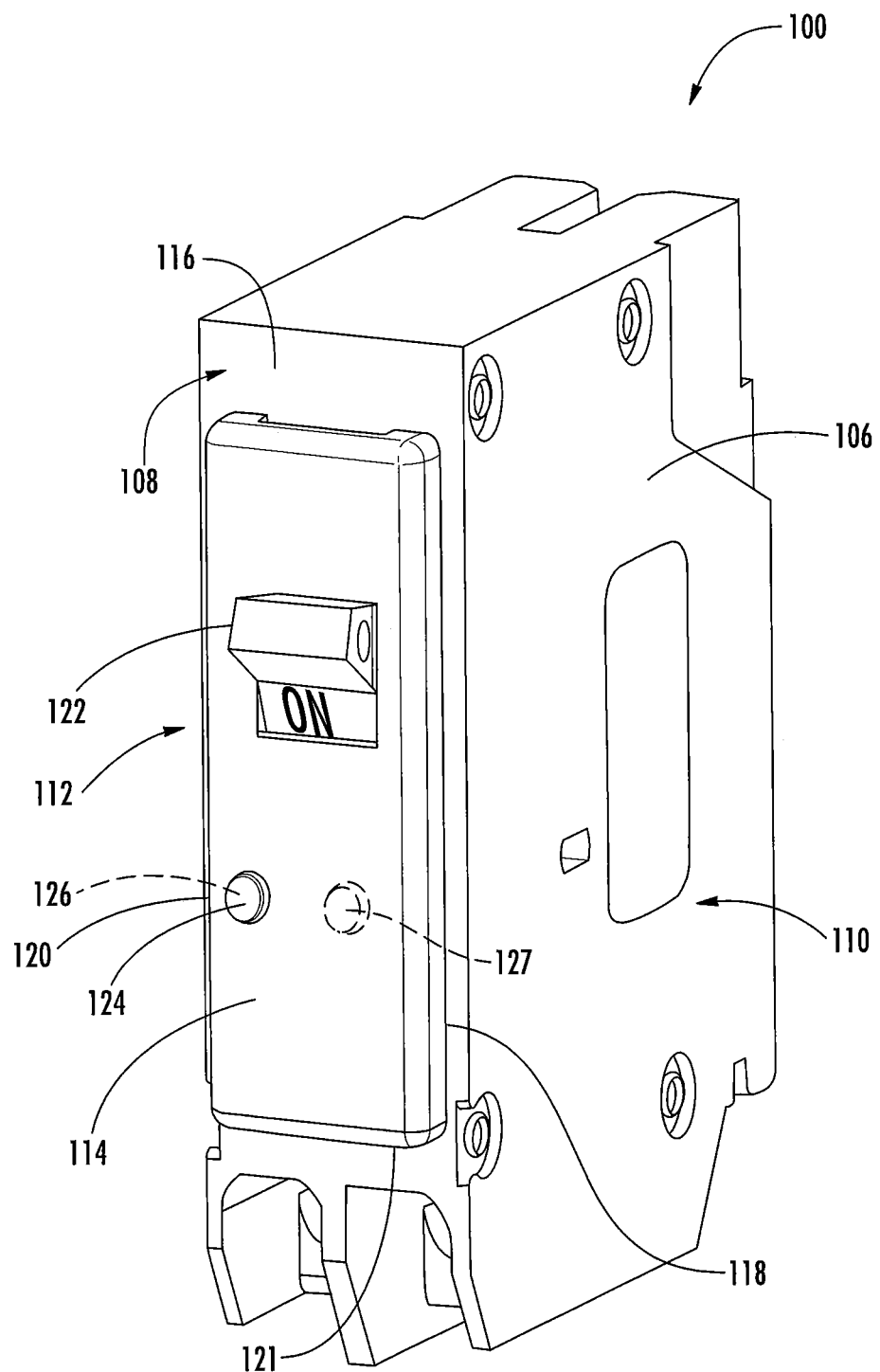
FIG. 2 is a front perspective view of a circuit breaker of the system of FIG. 1 according to some embodiments.

Referring to FIG. 2, the circuit breaker 100 includes an enclosure or housing 106. The housing 106 includes a front or front portion 108 and first and second laterally spaced apart opposite sides or side portions 110, 112. A front or exposed face 114 may be on the front portion 108. The front face 114 may be raised relative to a flat surface 116 of the front portion 108. The raised front face 114 may include a perimeter with first and second laterally spaced apart opposite side surfaces or walls 118, 120. The raised front face 114 may also include a lower or bottom surface or wall 121.

The circuit breaker 100 includes a handle or switch 122 at the front portion 108 of the housing 106. The handle 122 may extend through the front face 114. The handle 122 is movable (e.g., pivotable) between an on position (FIG. 2) and an off position (FIG. 1). As is understood by those skilled in the art, under normal operation, the circuit breaker 100 may electrically connect a power source and a load when the handle 122 is in the on position and may electrically disconnect the power source and the load when the handle is in the off position.

The circuit breaker 100 may include a user interface input such as a test button 124 at the front portion 108 of the housing 106. The button 124 may extend through or be flush with the front face 114 (e.g., when not depressed). The circuit breaker 100 may include a light source 126 such as an LED. The test button 124 may be translucent or transparent such that the light source 126 is configured to illuminate the button 124. The light source 126 may be integrated with the button 124, may be positioned in the button 124, or may otherwise be positioned so as to illuminate the button 124.

Alternatively, there may be a light source 127 such as an LED on the front face 114 or elsewhere on the circuit breaker 100. For example, the light source 127 may be adjacent the button 124 as shown in FIG. 2.

Figure 3:
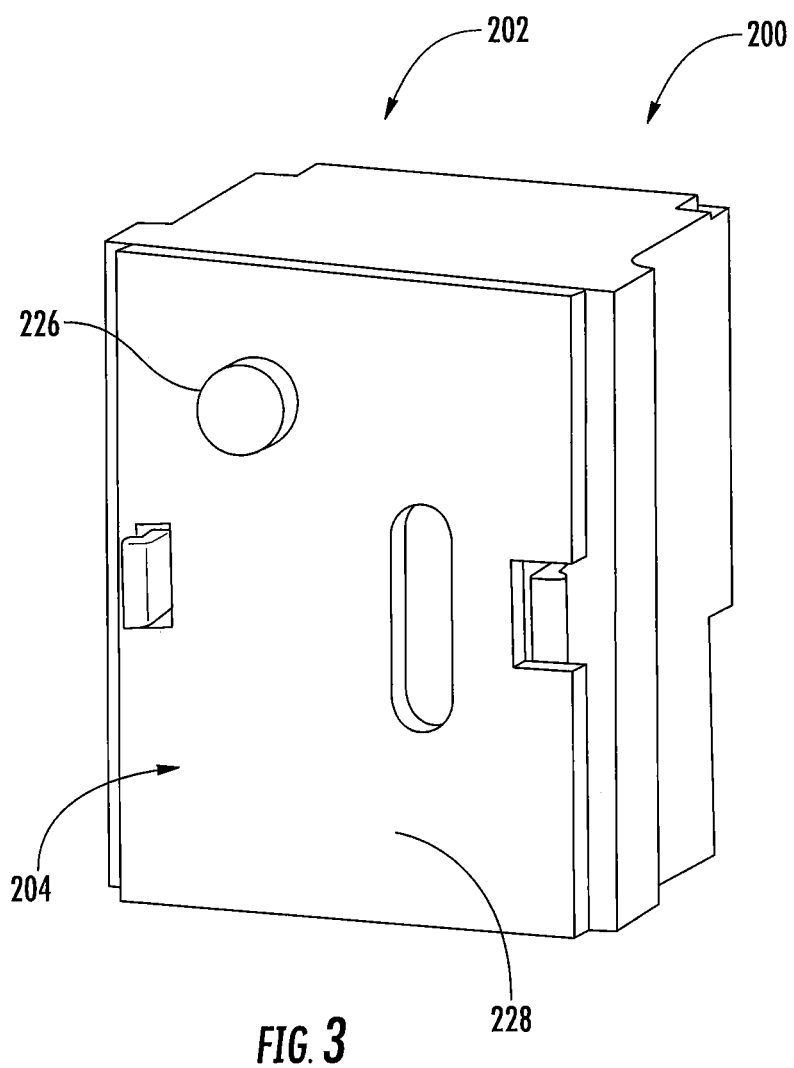
FIG. 3 is a front perspective view of an adapter of the system of FIG. 1 according to some embodiments.
Figure 4A:
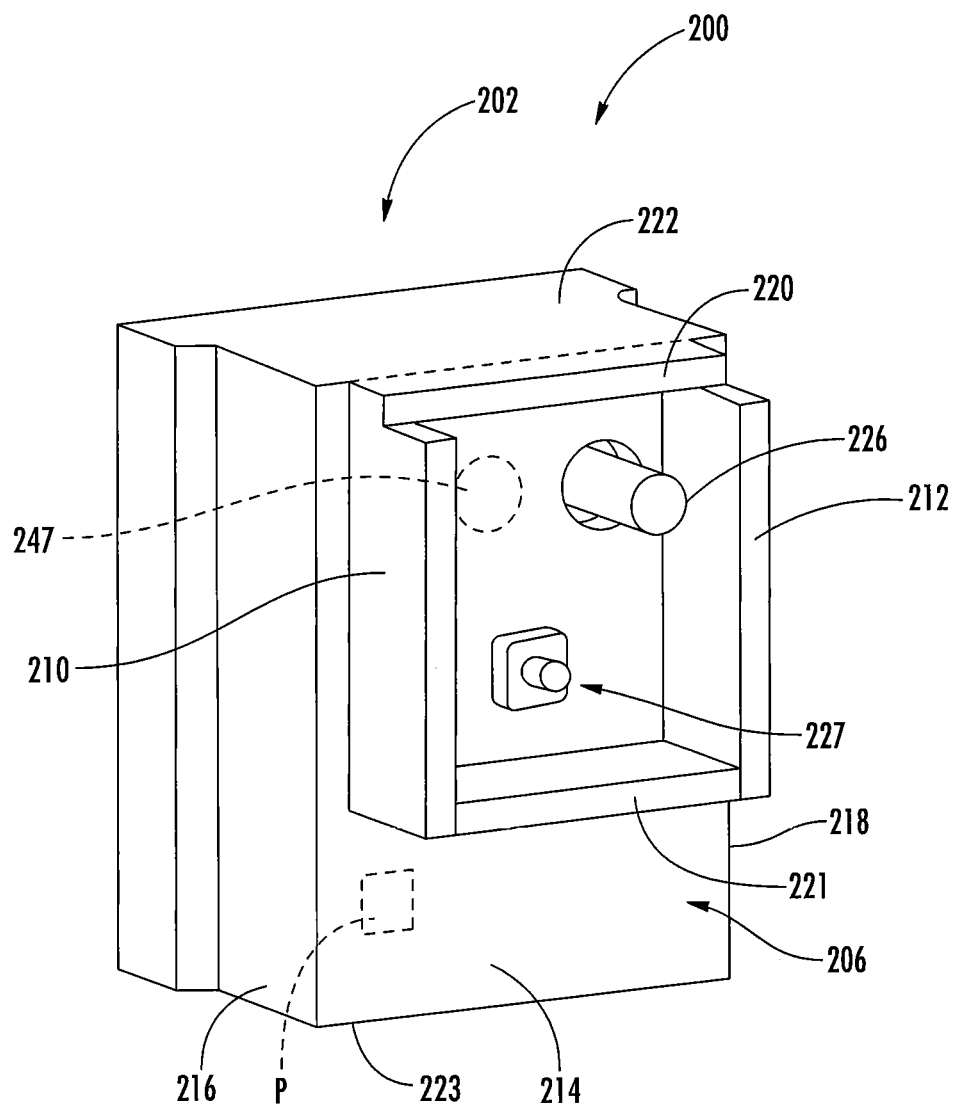
FIG. 4A is a rear perspective view of the adapter of FIG. 3.

Referring to FIGS. 3 and 4A, the adapter 200 includes an enclosure or housing 202. The housing 202 includes a front portion 204 and a rear portion 206. The adapter 200 includes first and second spaced apart side rails 210, 212 at the rear portion 206. The rails 210, 212 may extend vertically and project outwardly from a rear face or surface 214 of the adapter housing 202. Alternatively, the rails may extend from first and second side faces or surfaces 216, 218 of the adapter housing 202, respectively.

The adapter 200 may include an upper rail 220. The upper rail 220 may be perpendicular to the first and second side rails 210, 212. The upper rail 220 may be a continuation of and/or may be flush with an upper face or surface 222 of the adapter housing 202.

The adapter may include a lower rail 221. The lower rail 221 may be perpendicular to the first and second side rails 210, 212. The lower rail 221 may extend outwardly from the rear surface 214 a greater amount or distance than the upper rail 220. The lower rail 221 may extend outwardly from the rear surface 214 the same or about the same amount or distance as the first and second side rails 210, 212.

The adapter 200 may include an actuator 226. The actuator 226 may be configured to protrude from a front face or surface 228 of the adapter housing 202. The actuator 226 may also be configured to protrude from the rear face 214 of the adapter housing 202 between the first and second side rails 210, 212. The actuator 226 may be closer to one of the side rails 210, 212 than the other of the side rails 210, 212 (e.g., the actuator 226 may be closer to the side rail 212 than the side rail 210). The actuator 226 may be closer to the upper surface 222 than a lower surface 223 of the adapter housing 202.

The adapter 200 may include a power or wake up button 227 that protrudes from the rear surface 214 of the adapter 200.

Figure 5A:
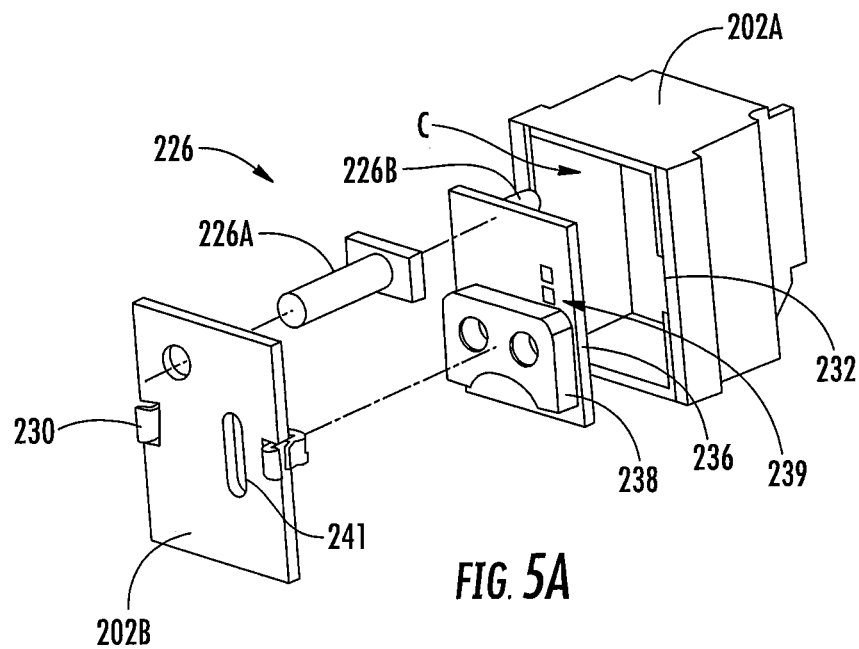
FIG. 5A is an exploded view of the adapter of FIG. 3.
Figure 5B:
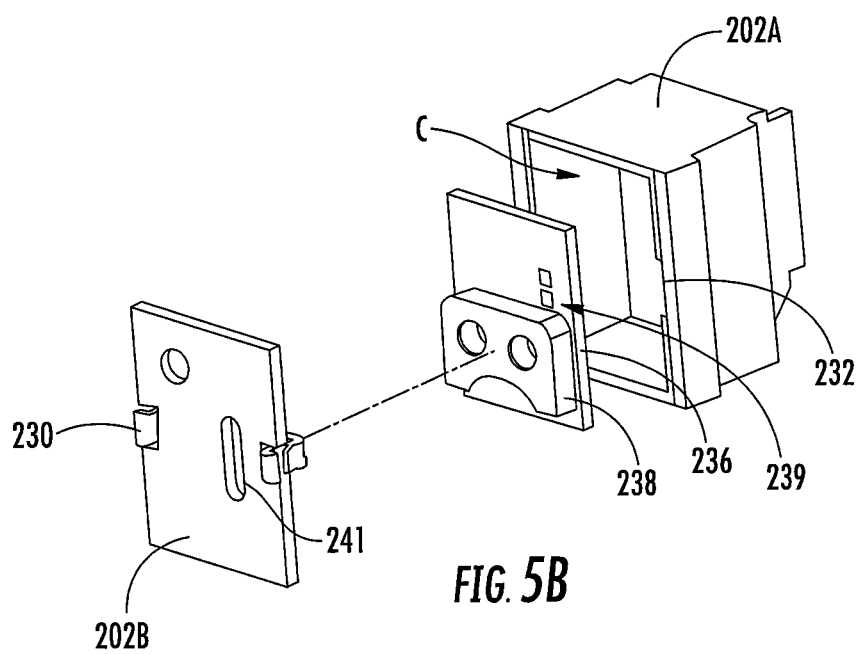
FIG. 5B is an exploded view of the adapter of FIG. 4B.

FIG. 5A is an exploded view of the adapter 200 according to some embodiments. The adapter housing 202 may include a first housing portion or base 202A and a second housing portion or cover 202B. The cover 202B may include tabs 230 on opposite sides thereof. The tabs 230 may be configured to be received in grooves 232 in the base 202A to couple the cover 202B to the base 202A. Other attachment features may be used.

The base 202A may define an interior cavity C. The cavity C may be configured to be enclosed or substantially enclosed when the cover 202B is coupled to the base 202A.

A substrate or printed circuit board (PCB) 236 may be disposed in the cavity C. An electronic component housing 238 may be on and/or electrically coupled to the PCB 236. As described in more detail below, the electronic component housing 238 may hold, for example, a controller and a wireless communication unit with a transceiver or other wireless module.

One or more indicators 239 such as LEDs may be on the PCB 236. A slot or window 241 may be defined in the cover 202B to allow a user to view (visually access) the LED(s) 239.

Figure 6A:
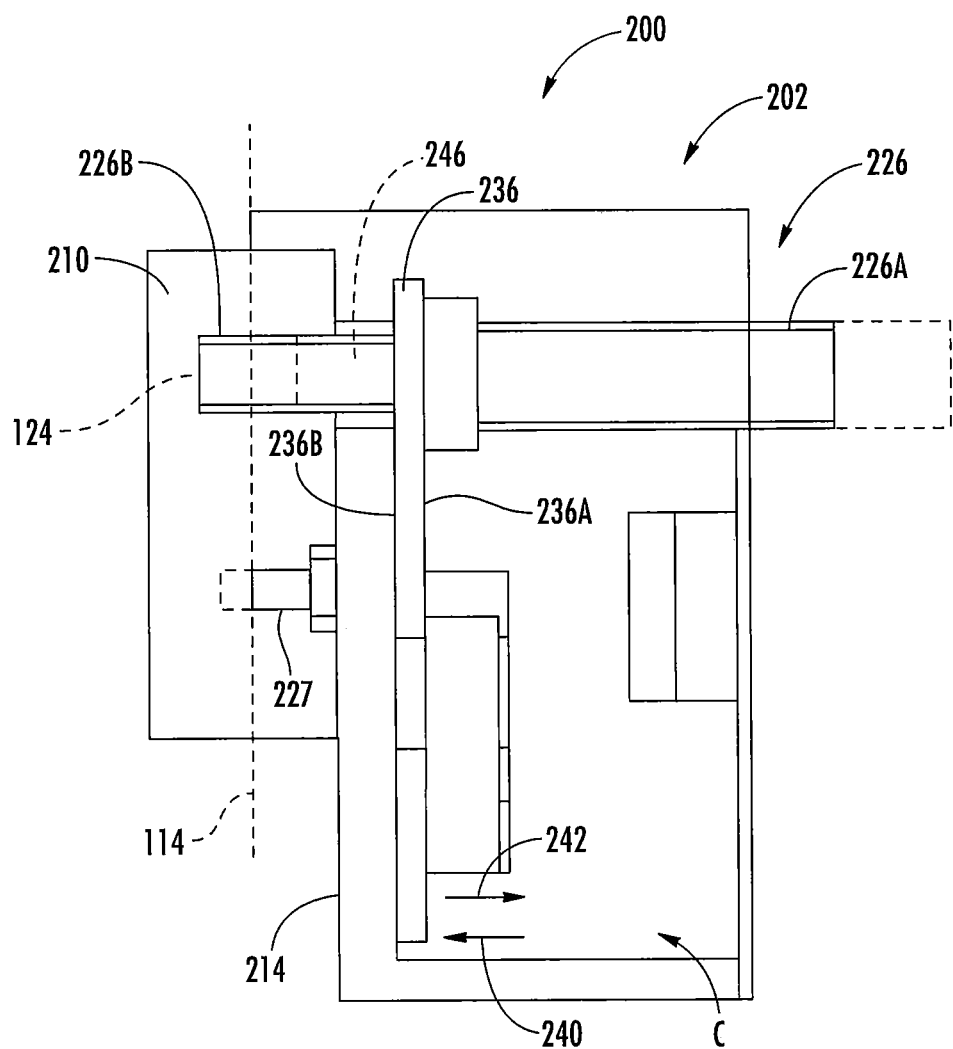
FIG. 6A is a sectional view of the adapter of FIG. 3.

Referring to FIGS. 5A and 6A, the actuator 226 may include a first actuator portion 226A and a second actuator portion 226B. The first actuator portion 226A is on a first side 236A of the PCB 236 and the second actuator portion 226B is on an opposite second side 236B of the PCB 236.

The PCB 236 may be movable or slidable within the cavity C of the adapter housing 202. The PCB 236 may move or slide in the direction 240 in response to a user actuating or depressing the actuator 226 (e.g., the first actuator portion 226A). The PCB 236 may move or slide in the direction 242 in response to the user releasing the actuator 226 (e.g., the first actuator portion 226A).

The actuator 226 (e.g., the second actuator portion 226B) may further protrude from the rear surface 214 of the adapter housing in response to the user actuating or depressing the actuator 226 (e.g., the first actuator portion 226A). For example, referring to FIG. 6, the first and second actuator portions 226A, 226B may be in the position shown in dashed lines in a rest state. The first and second actuator portions 226A, 226B may be in the position shown in solid lines in an actuated state after the user actuates the first actuator portion 226A.

The adapter 200 may include a light sensor 246. The light sensor 246 may be integrated with or held in the actuator 226 (e.g., the second actuator portion 226B) or otherwise coupled to the actuator 226. The light sensor 246 may be on and/or electrically coupled to the PCB 236. Alternatively, referring to FIGS. 2 and 4B, where the LED 127 is used, the adapter 200 may include a light sensor 247 that may be on and/or electrically coupled to the PCB 236.

Figure 4B:
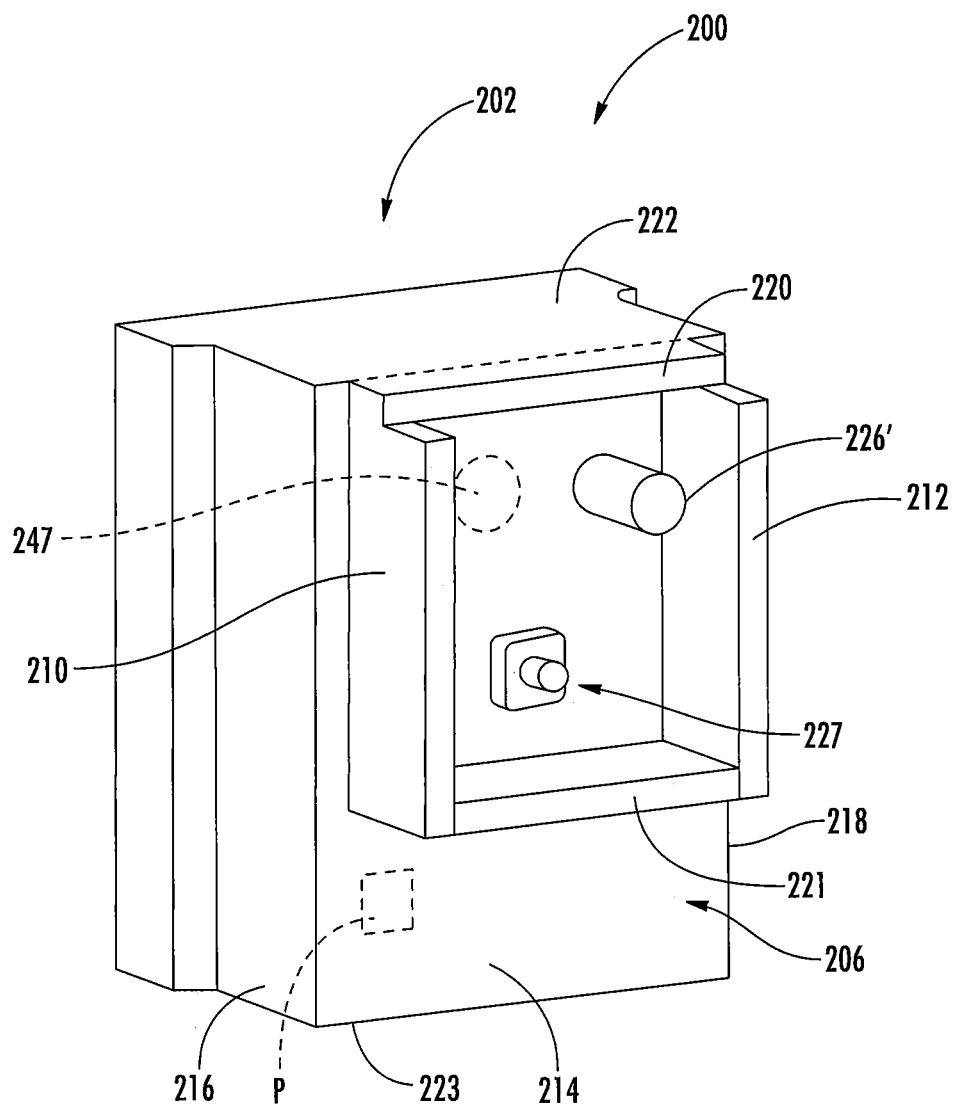
FIG. 4B is a rear perspective view of an adapter of the system of FIG. 1 according to some other embodiments.
Figure 7:
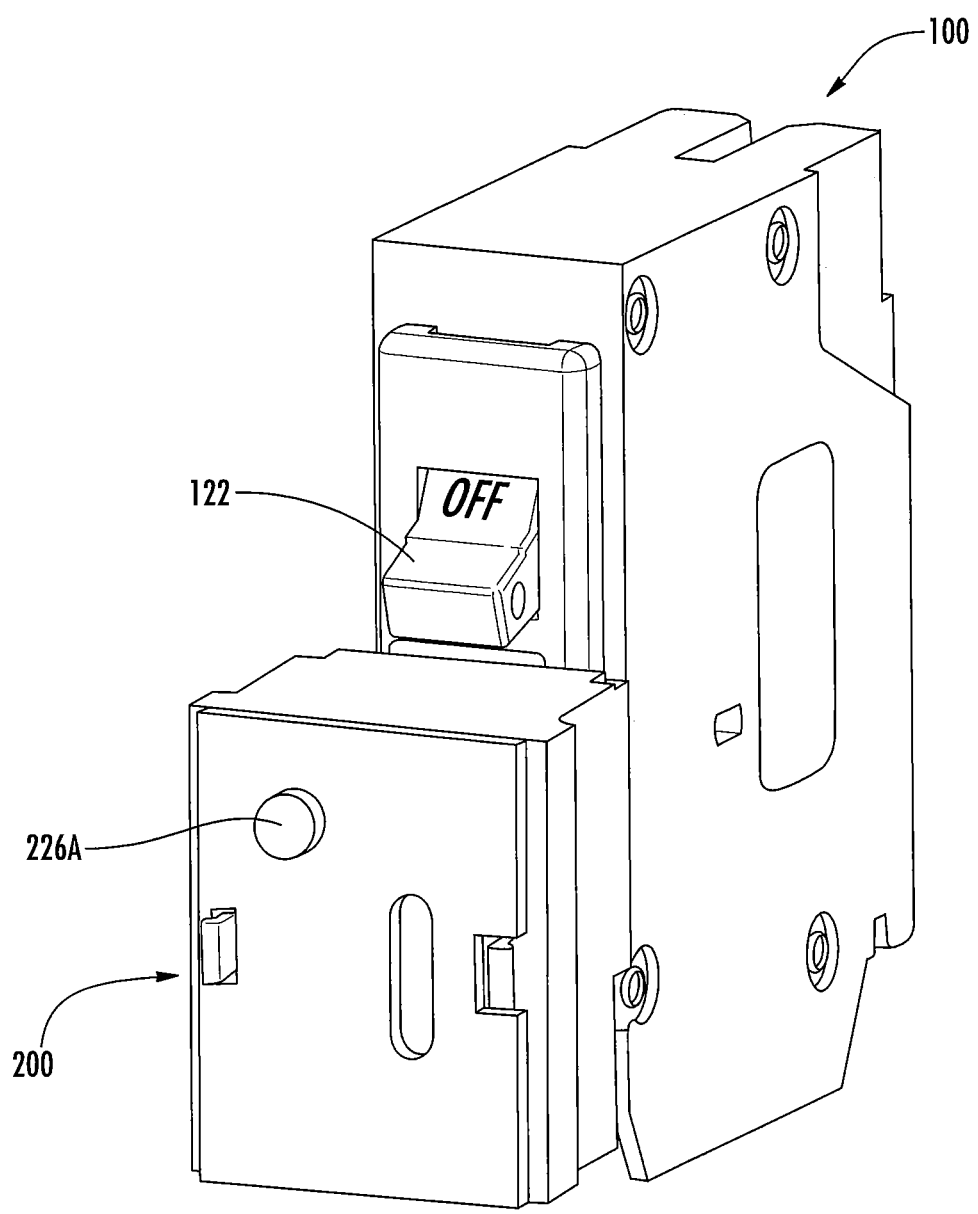
FIG. 7 is a perspective view of the adapter of FIG. 3 installed on the circuit breaker of FIG. 2 in an installed position.

In use, a user installs the adapter 200 on the circuit breaker 100 in the installed position as shown in FIG. 7. With reference to FIGS. 2, 4A, and 4B, the first and second rails 210, 212 may engage the first and second side surfaces 118, 120, respectively, of the circuit breaker front face 114. The first and second rails 210, 212 may be spaced apart the same distance or a lesser distance than the first and second side surfaces 118, 120 so that the adapter 200 is held on the circuit breaker 100 with a friction or interference fit in the installed position.

Alternatively, the first and second rails 210, 212 may engage the first and second sides 110, 112 of the circuit breaker 100 and the adapter 200 may be held on the circuit breaker 100 with a friction or interference fit. Other releasably attachable configurations may be used.

The first and second rails 210, 212 may help align the adapter 200 in a first direction (e.g., horizontally). The lower rail 221 may help align the adapter 200 in a second direction that is perpendicular to the first direction (e.g., vertically). In the installed position, the lower rail 221 may engage the lower surface 121 of the circuit breaker front face 114. The cooperation of the lower rail 221 and the lower surface 121 of the circuit breaker front face 114 may contribute to the friction fit with the adapter 200 in the installed position.

In the installed position, the second actuator portion 226B of the adapter 200 (FIG. 6A) may be aligned with the test button 124 of the circuit breaker 100 (FIG. 2). In this regard, the light sensor 246 of the adapter 200 (FIG. 6A) may be aligned with the light source 126 of the circuit breaker (FIG. 2). Alternatively, in the installed position, the light sensor 246 of the adapter 200 (FIG. 4A) may be aligned with the light source 127 of the circuit breaker (FIG. 2).

Figure 8:
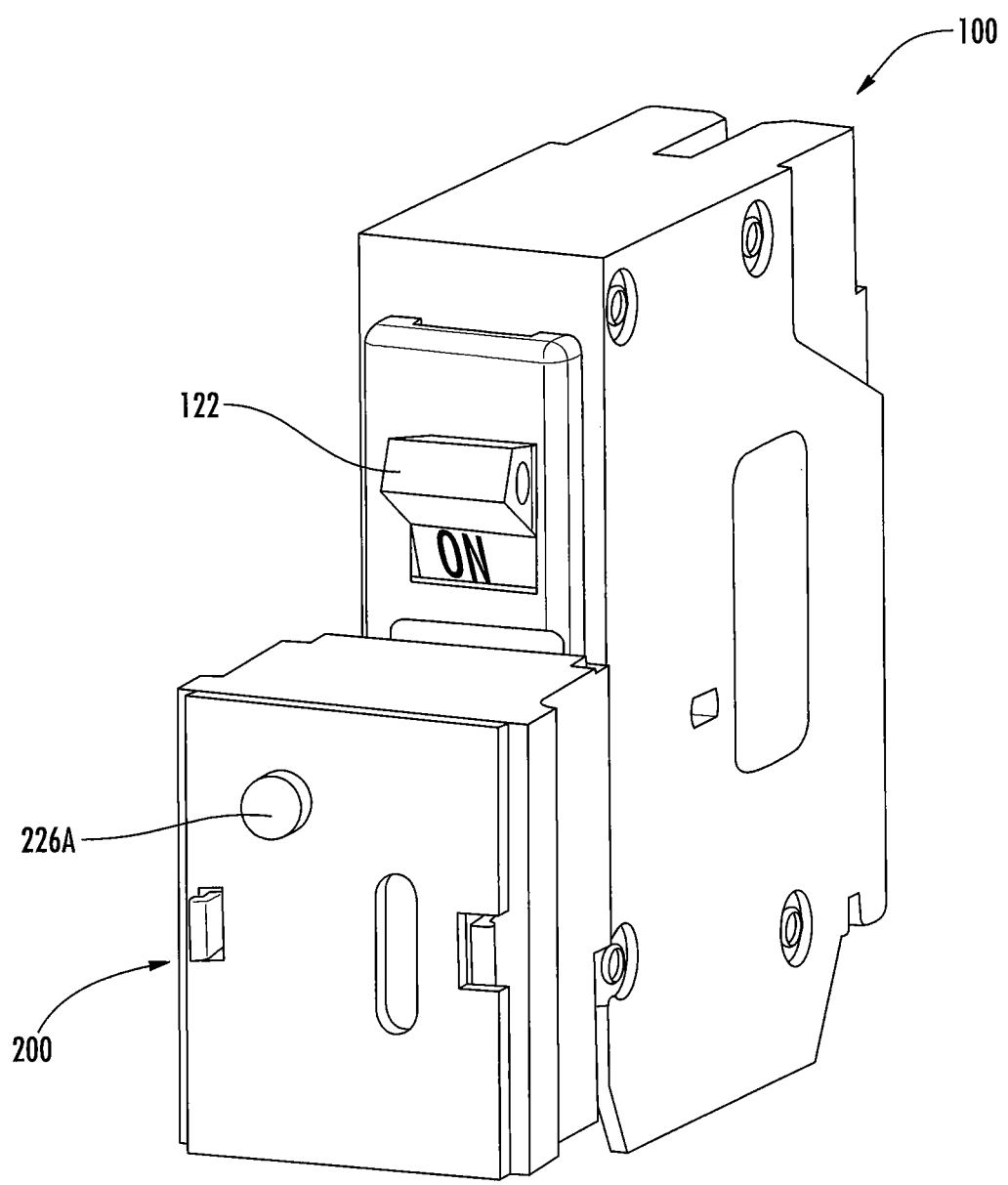
FIG. 8 is another perspective view of the adapter of FIG. 3 installed on the circuit breaker of FIG. 2 in the installed position.

The adapter 200 may receive and collect operational data of the circuit breaker 100 with the adapter 200 in the installed position. For example, the user may actuate or depress the first actuator portion 226A such that the second actuator portion 226B moves to the position shown in solid lines in FIG. 6. The second actuator portion 226B may then actuate or depress the test button 124 of the circuit breaker 100 (FIG. 2). The user may then move the handle 122 of the circuit breaker 100 to the on position as shown in FIG. 8. After a predetermined amount of time of actuating or depressing the first actuator portion 226A, the user may release the first actuator portion 226A. In some embodiments, the predetermined amount of time is between one and ten seconds, such as two seconds. This may trigger the circuit breaker 100 to pulse the light source 126 or 127 (FIG. 2), with the light pulses representative of operational data of the circuit breaker 100. The light pulses may be detected by the light sensor 246 or 247 of the adapter 200 (FIGS. 4A and 6A). The data may be processed and/or transmitted, e.g., wirelessly, to the electronic device 100 (FIG. 1).

The operational data of the circuit breaker 100 may include trip history, fault conditions, load characteristics, and/or measurements taken by the circuit breaker. The operational data may include or identify a cause of a trip of the circuit breaker 100. However, the operational data may also include other information other than the cause of a trip including, but not limited to, information related to the cause of the trip that may be beneficial in diagnosing the circuit breaker 100 or any circuits associated therewith. The operational data may include, for example and without limitation, a voltage level, a current level, or a peak level prior to a trip, a number of lifetime trips, and high frequency characteristics. The operational data may also include, for example and without limitation, a logged history of each fault instance and root cause of trip, other various information prior to a trip, a time duration between a fault event and a trip command, or other information not directly related to the most recent fault. Example fault conditions include, but are not limited to, an over current, a short circuit, a ground fault, or an arc fault.

It is contemplated that, instead of the moving actuator 226 as described above, the adapter 200 may include a fixed protrusion such as a pin or post that engages the test button 124 of the circuit breaker 100 when the adapter 200 is in the installed position. For example, referring to FIGS. 4B and 6B, the adapter 200 may include a protrusion 226' such as a pin or post that protrudes from or extends away from the rear surface 214 of the adapter 200. The protrusion 226' may be positioned and configured to engage the test button 124 of the circuit breaker when the adapter 200 is in the installed position. The light sensor 246 may be integrated with or held in the protrusion 226' or otherwise coupled to the protrusion 226'. The PCB 236 may be fixed in the cavity C of the adapter housing 202 rather than being movable or slidable therein.

Figure 6B:
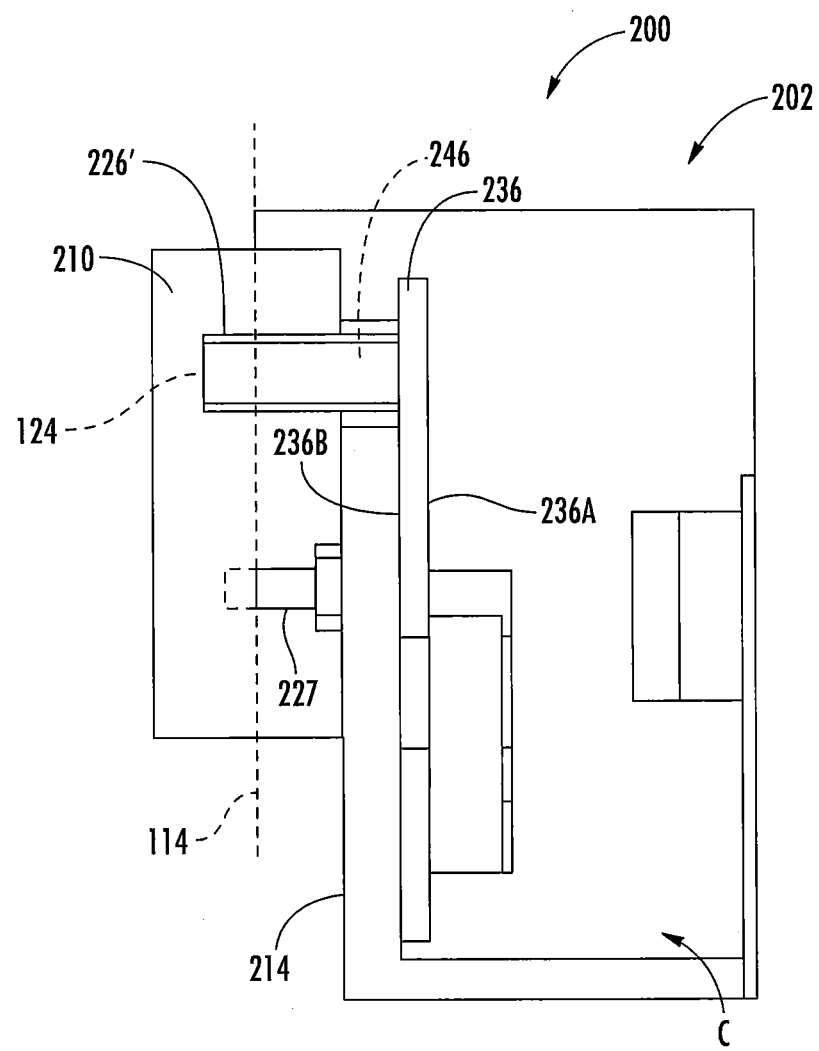
FIG. 6B is a sectional view of the adapter of FIG. 4B.

In such an embodiment, the user may install the adapter 200 in the installed position on the circuit breaker 100; as a result, the protrusion 226' actuates the test button 124 of the circuit breaker 100 (FIG. 2). The user may then move the handle 122 of the circuit breaker 100 to the on position. After a predetermined amount of time after moving the handle 122 to the on position, the circuit breaker 100 may pulse the light source 126 or 127 (FIG. 2), with the light pulses representative of operational data of the circuit breaker 100. The light pulses may be detected by the light sensor 246 or 247 of the adapter 200 (FIGS. 4B and 6B). The data may be processed and/or transmitted, e.g., wirelessly, to the electronic device 100 (FIG. 1).

It is also contemplated that some other portion of the adapter 200 may actuate or engage the test button 124 of the circuit breaker 100 when the adapter 200 is in the installed position. For example, the rear surface 214 of the adapter 200 may actuate or engage the test button 124 of the circuit breaker 100 when the adapter 200 is in the installed position.

Referring to FIGS. 2, 4A, 4B, 6A, and 6B, when the user releasably attaches the adapter 200 on the circuit breaker 100 in the installed position, the circuit breaker front face 114 may engage the on button 227 on the adapter rear surface 214. This may place the adapter 200 in standby mode such that the adapter 200 is ready to receive data from the circuit breaker 100. For example, the on button 227 may operate a circuit associated with an internal power source P of the adapter 200 (e.g., a battery).

Figure 9:
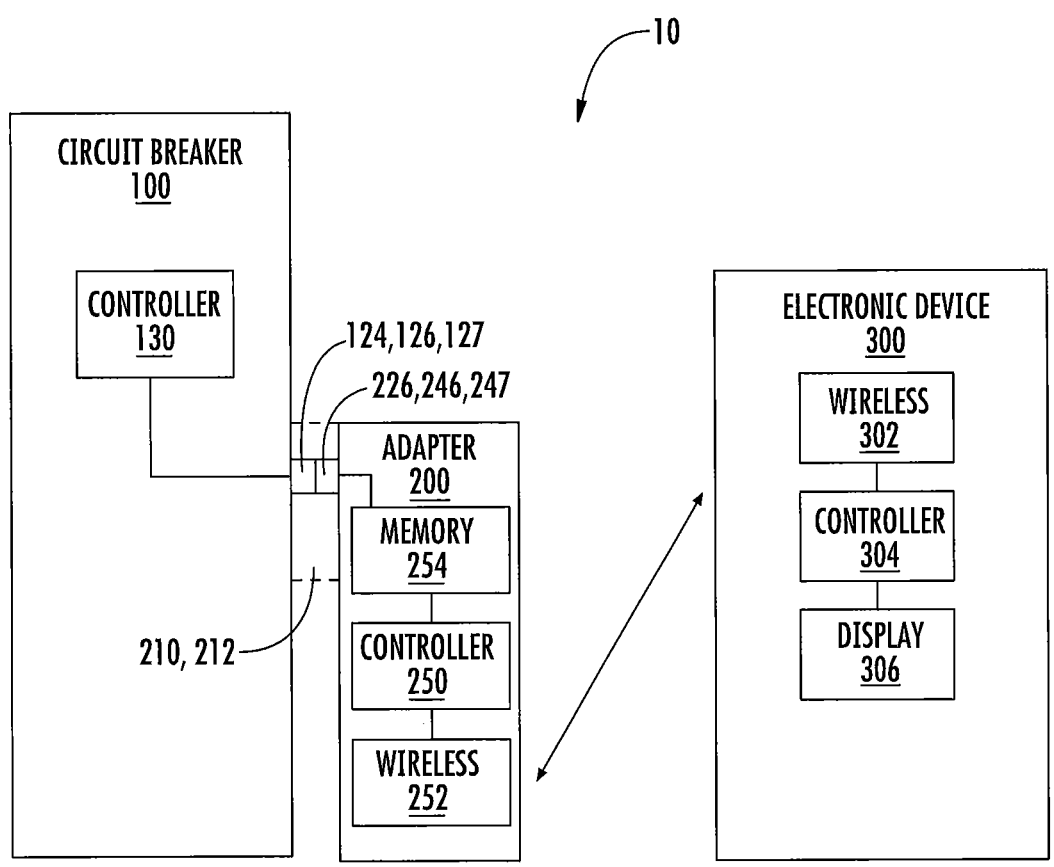
FIG. 9 is a schematic diagram of the system of FIG. 1.

The system 10 is further illustrated schematically in FIG. 9. In response to the user action, a controller or processor 130 of the circuit breaker 100 may encode the operational data into light pulses and direct the light source 126 or 127 to output the light pulses. The light sensor 246 or 247 of the adapter 200 communicates with (and may be aligned with) the light source 126 or 127 of the circuit breaker 100. The light sensor 246 or 247 may sense the light pulses. The light pulses may be converted to digital data and sent to a controller or processor 250 of the adapter 200. The controller 250 may decode the data into digital bits using, e.g., an asynchronous method of measuring the width of the light pulses. The adapter 200 may include a wireless communication module or unit 252 including a transmitter or transceiver to transmit the data to the electronic device 300 (e.g., via Bluetooth, Wifi, etc.). The electronic device 300 may include a wireless communication module or unit 302 including a receiver or transceiver to receive the data. The electronic device 300 may include a controller or processor 304 that is configured to direct a display device 306 to display the data thereon.

The electronic device 300 may be any suitable electronic device. For example, the electronic device 300 may be portable electronic device such as a smartphone or a tablet computer.

FIG. 10 illustrates the enclosure 102 holding a plurality of the circuit breakers 100. The adapter 200 is shown in the installed position on one of the circuit breakers 100. It can be seen that, when the adapter 200 is installed on one of the circuit breakers 100, the adapter 200 may not physically interfere with any of the other circuit breakers 100. That is, the adapter 200 may not interfere with the functionality of any of the other circuit breakers 100 such as operation of the handles or test buttons. Further, the adapter 200 may be installed on the circuit breaker 100 without removing the panel or dead front 104.

In addition, with reference to FIG. 4, the side rails 210, 212, the upper rail 220, and/or the lower rail 221 of the adapter 200 may be configured to block and/or help reject ambient light. The may reduce the chance of data errors during data transfer from the circuit breaker 100 to the adapter 200. Referring to FIGS. 2, 4A, and 4B, and described above, the side rails 210, 212 may engage side surfaces 118, 120 of the circuit breaker front face 114 and the lower rail 221 may engage the lower surface 121 of the circuit breaker front face 114 when the adapter 200 is in the installed position. In addition, the upper rail 220 may engage the circuit breaker front face 114 when the adapter 200 is in the installed position to thereby effectively block ambient light during data transfer. In this regard, it is contemplated that the light source of the circuit breaker and the light sensor of the adapter do not need to be precisely aligned in some embodiments. That is, the light source and the light sensor may be optically coupled with the adapter in the installed position on the circuit breaker.

Figure 11:
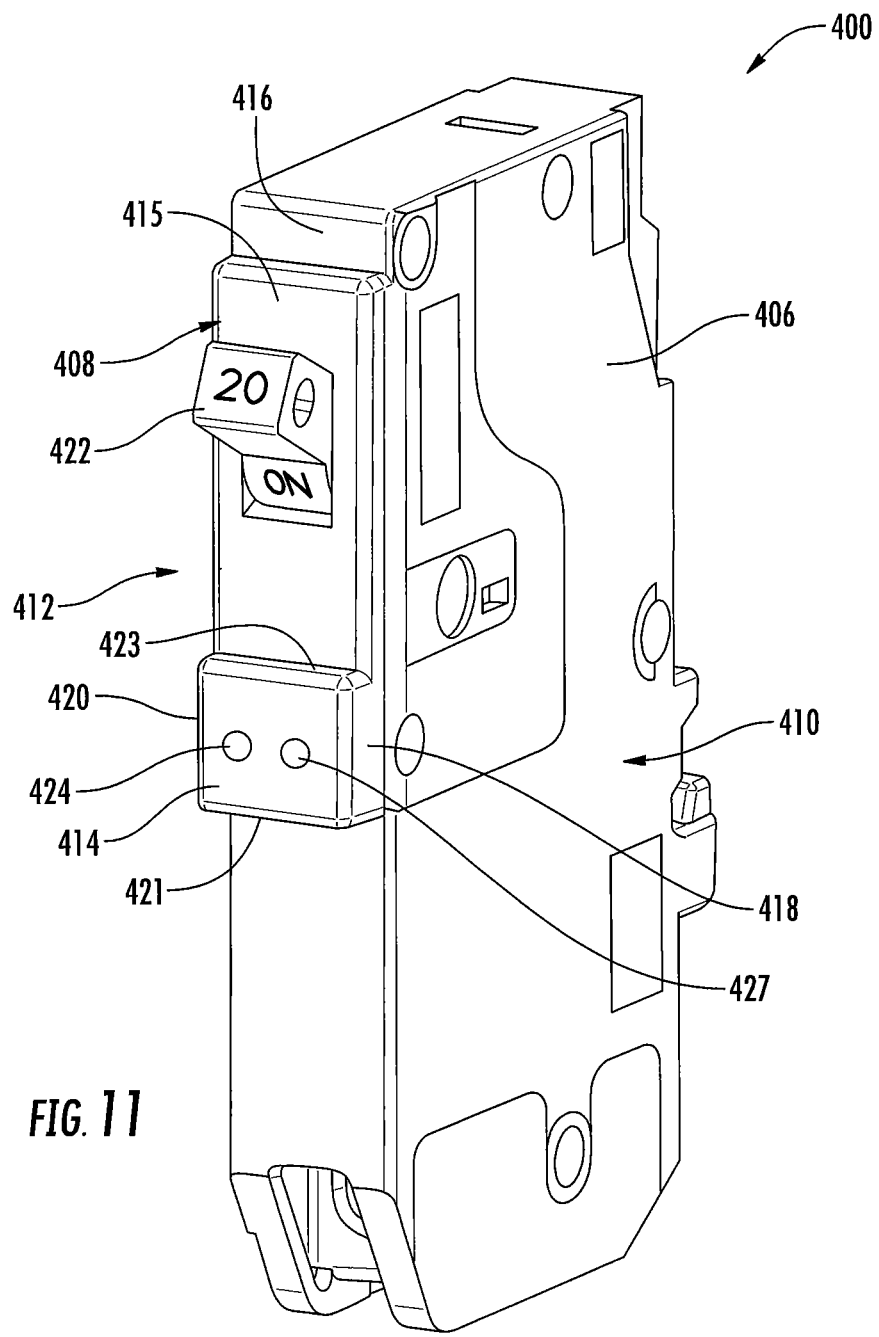
FIG. 11 is a front perspective view of a circuit breaker of the system of FIG. 1 according to some other embodiments.
Figure 12A:
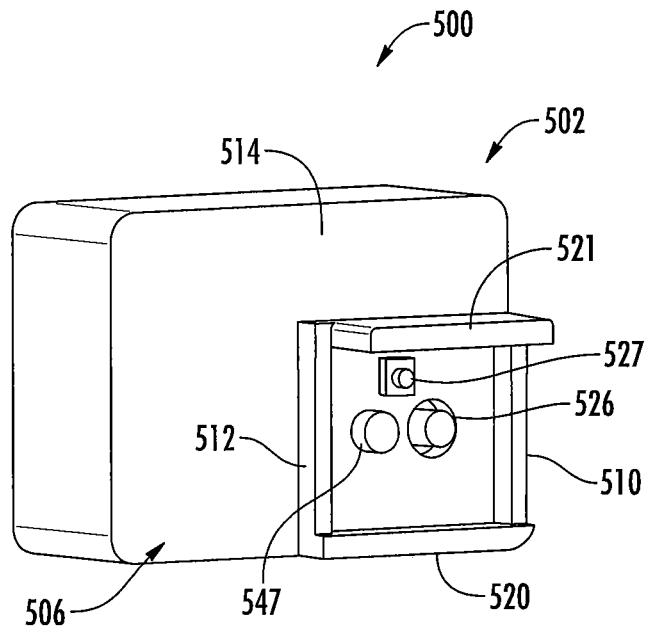
FIGS. 12A and 12B are rear perspective views of an adapter of the system of FIG. 1 according to some other embodiments.
Figure 12B:
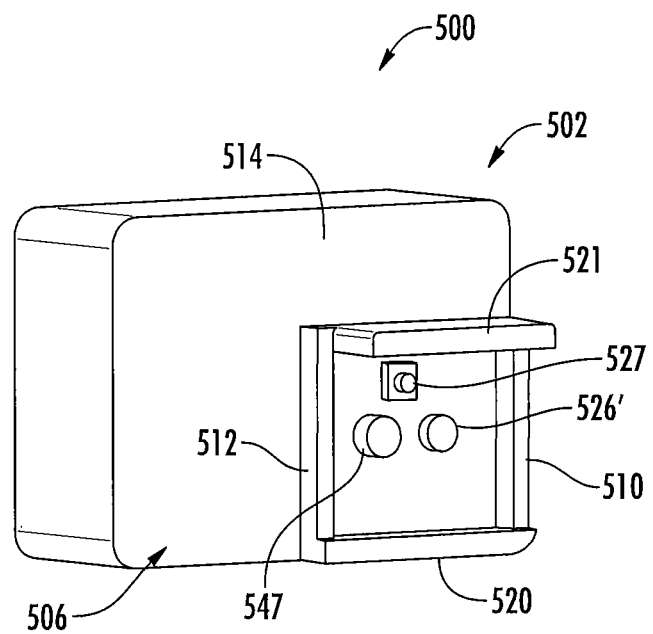

FIG. 11 illustrates another example circuit breaker 400. FIGS. 12A and 12B illustrate embodiments of an adapter 500 that can be used with the circuit breaker 400 in a similar way as described above in reference to the circuit breaker 100 and the adapter 200. The circuit breaker 400 and the adapter 500 may be used in the system 10 (FIG. 1) in place of the circuit breaker 100 and the adapter 200. The primary differences between the circuit breaker 400 and the circuit breaker 100 and the adapter 500 and the adapter 200 relate to how the adapter 500 releasably attaches to the circuit breaker 400, as described below.

Referring to FIG. 11, the circuit breaker 400 includes an enclosure or housing 406. The housing 406 includes a front or front portion 408 and first and second laterally spaced apart opposite sides or side portions 410, 412. A primary front or exposed face 414 may be on the front portion 408. The primary front face 414 may be raised relative to a flat surface 416 of the front portion 408. The primary raised front face 414 may include a perimeter with first and second laterally spaced apart opposite side surfaces or walls 418, 420. The primary raised front face 414 may also include a lower or bottom surface or wall 421 and/or an upper or top surface or wall 423. A secondary front or exposed face 415 may be on the front portion 408. The secondary front face 415 may be raised relative to the flat surface 416 of the front portion 408, but may be raised to a lesser degree than the primary raised front face 414 (e.g., the primary front face 414 may extend a greater distance away from the flat surface 416 than does the secondary front face 415).

The circuit breaker 400 includes a handle or switch 422 at the front portion 408 of the housing 406. The handle 422 may extend through the flat surface 416 of the front portion 408 or may extend through the secondary front face 415. The handle 422 is movable (e.g., pivotable) between an on position and an off position, with the handle 422 shown in the on position in FIG. 11. The handle 422 may function in the same way or substantially the same way as the handle 122 of the circuit breaker 100.

The circuit breaker 400 may include a user interface input such as a test button 424 at the front portion 408 of the housing 406. The button 424 may extend through or be flush with the front face 414 (e.g., when not depressed). The button 424 may function in the same way or substantially the same way as the button 124 of the circuit breaker 100. There may be a light source 427 such as an LED on the front face 414 or elsewhere on the circuit breaker 400. For example, the light source 427 may be adjacent the button 424. The light source 427 may function in the same way or substantially the same way as the light source 127 of the circuit breaker 100.

Referring to FIGS. 12A and 12B, the adapter 500 includes an enclosure or housing 502. The housing 502 includes a front portion 504 (FIG. 13) and a rear portion 506. The adapter 500 includes first and second spaced apart side rails 510, 512 at the rear portion 506. The rails 510, 512 may extend outwardly from a rear face or surface 514 of the adapter housing 202.

The adapter 500 may include an upper rail 520. The upper rail 520 may be perpendicular to the first and second side rails 510, 512. The adapter 500 may include a lower rail 521. The lower rail 521 may be perpendicular to the first and second side rails 510, 512. The lower rail 521 may extend outwardly from the rear surface 514 a greater amount or distance than the upper rail 520. The lower rail 521 may extend outwardly from the rear surface 514 the same or about the same amount or distance as the first and second side rails 510, 512.

Referring to FIG. 12A, the adapter 500 may include an actuator 526 that functions the same way or substantially the same way as the actuator 226 of the adapter 200. Alternatively, referring to FIG. 12B, the adapter 200 may include a fixed protrusion 526' such as a pin or post that engages the test button 124 of the circuit breaker 100 when the adapter 200 is in the installed position (FIG. 13).

The adapter 500 may include a power or wake up button 527 that protrudes from the rear surface 514 of the adapter 500. The power button 527 may function in the same way or substantially the same way as the power button 227 of the adapter 200.

The adapter 500 may include a light sensor 547 at the rear portion 506 thereof. The light sensor 547 may function in the same way or substantially the same way as the light sensor 247 of the adapter 200.

Figure 13:
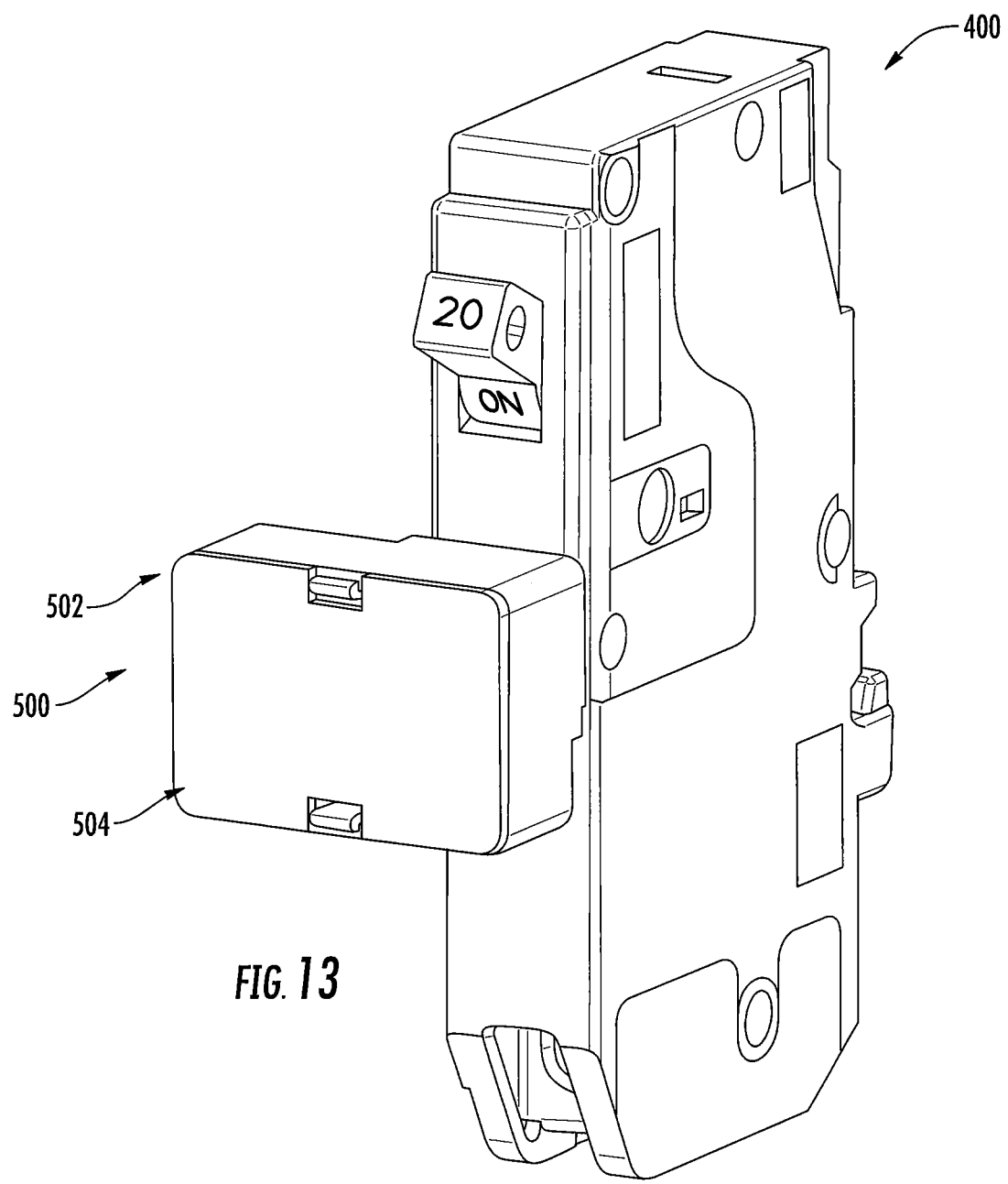
FIG. 13 is a perspective view of the adapter of FIG. 12B installed on the circuit breaker of FIG. 11 in an installed position.

In use, a user installs the adapter 500 on the circuit breaker 400 in the installed position as shown in FIG. 13. With reference to FIGS. 11, 12A, and 12B, the first and second rails 510, 512 may engage the first and second side surfaces 418, 420, respectively, of the circuit breaker front face 114. The first and second rails 510, 512 may be spaced apart the same distance or a lesser distance than the first and second side surfaces 418, 420 so that the adapter 500 is held on the circuit breaker 400 with a friction or interference fit in the installed position.

The first and second rails 510, 512 may help align the adapter 500 in a first direction (e.g., horizontally). The lower rail 521 may help align the adapter 500 in a second direction that is perpendicular to the first direction (e.g., vertically). In the installed position, the lower rail 521 may engage the lower surface 421 of the circuit breaker front face 414. In the installed position, the upper rail 520 may engage the upper surface 423 of the circuit breaker front face 414. The cooperation of the lower rail 521 and the lower surface 421 of the circuit breaker front face 414 and/or the cooperation of the upper rail 520 and the upper surface 423 of the circuit breaker front face 414 may contribute to the friction fit with the adapter 500 in the installed position.

The adapter lower rail 521 may extend from the adapter rear surface 514 a greater distance than the adapter upper rail 520. This may be due to the circuit breaker lower surface 421 extending a greater distance from the flat surface 416 than does the circuit breaker upper surface 423.

In the installed position, the adapter 500 may receive operational data from the circuit breaker 400 in the same or similar manner as described above in reference to the circuit breaker 100 and the adapter 200. The rails 510, 512, 520, 521 may be configured to block and/or help reject ambient light. The may reduce the chance of data errors during data transfer from the circuit breaker 400 to the adapter 500.

A user can fit the adapter described herein on a circuit breaker and perform a unique action to initiate transfer of data the breaker has collected during its time in use. The data that is transferred to the adapter can then be transferred to a cellular phone or smartphone, laptop, or other suitable electronic device for analysis. This solution is unique as it does not require the load center's dead front to be removed or the circuit breaker to be disassembled in any way while still receiving operational data for diagnostics.

With the introduction of this solution, a technician can visit a problem site without an electrician, as the technician will not be exposed to any dangerous voltage levels because the dead front does not need to be removed and the breakers remain in place. The technician can use the adapter to gather data from as many breakers as the technician deems appropriate to diagnose the problem, and potentially diagnose the problem with significantly greater speed and accuracy. This solution also eliminates the need to scrap a potentially functional breaker. It is believed this solution can increase the speed at which problems can be resolved and provide an additional level of service that previously did not exist to the same capacity.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A system comprising:
a circuit breaker comprising a front face with a light source on the front face; and
an adapter configured to be releasably held on the front face in an installed position, the adapter comprising a light sensor, wherein the light source and the light sensor are configured to communicate such that the adapter receives operational data from the circuit breaker in the installed position.

2. The system of claim 1 wherein:
the adapter comprises a housing having a front portion and a rear portion, the rear portion comprising first and second spaced apart side rails that are configured to engage first and second side surfaces of the front face to hold the adapter in the installed position optionally with a friction fit.

3. The system of claim 2 wherein:
the rear portion of the adapter housing comprises a lower rail that is configured to engage a lower surface of the front face in the installed position.

4. The system of claim 3 wherein:
the first and second side rails and the first and second side surfaces cooperate to align the adapter and the front face in a first direction; and
the lower rail and the lower surface cooperate to align the adapter and the front face in a second direction that is orthogonal to the first direction.

5. The system of claim 3 wherein:
the light sensor is aligned with the light source in the installed position;
the first and second side rails and the first and second side surfaces cooperate to align the light sensor and the light source in a first direction; and
the lower rail and the lower surface cooperate to align the light sensor and the light source in a second direction that is orthogonal to the first direction.

6. The system of claim 3 wherein:
the rear portion of the adapter housing comprises an upper rail that is configured to engage the front face in the installed position; and
the first and second side rails, the lower rail, and/or the upper rail are configured to block ambient light with the adapter in the installed position.

7. The system of claim 2 wherein:
the circuit breaker comprises a test button that protrudes from or is substantially flush with the front face;
the adapter is configured to actuate the test button when the adapter is in the installed position.

8. The system of claim 7 wherein:
the adapter comprises an actuator comprising a first actuator portion that is configured to extend through and protrude from the front portion of the adapter housing and a second actuator portion that is configured to extend through and protrude from the rear portion of the adapter housing;
the second actuator portion is configured to actuate the test button in response to a user actuating the first actuator portion.

9. The system of claim 8 wherein:
the first actuator portion is on a first side of a printed circuit board and the second actuator portion is on a second, opposite side of the printed circuit board;
the printed circuit board is optionally movably disposed in an interior cavity defined by the adapter housing.

10. The system of claim 1 wherein:
the circuit breaker is one of a plurality of circuit breakers held in an enclosure;
when the adapter is in the installed position on the circuit breaker, the adapter is sized to not interfere with the functionality of any other one of the plurality of circuit breakers.

11. The system of claim 1 further comprising an electronic device in communication with the adapter and configured to receive the operational data from the adapter.

12. The system of claim 11 wherein:
the electronic device is configured to wirelessly receive the operational data from the adapter;
the electronic device comprises a display device configured to display the operational data.

13. A method comprising:
installing an adapter on a circuit breaker in an installed position with the adapter held on the circuit breaker optionally with a friction fit;
aligning a light source of the circuit breaker with a light sensor of the adapter in response to installing an adapter on a circuit breaker in the installed position; and
receiving operational data of the circuit breaker at the adapter by receiving a light signal emitted by the light source with the light sensor.

14. The method of claim 13 wherein:
the adapter comprises a housing having front and rear portions and first and second spaced apart side rails at the rear portion;

installing the adapter on the circuit breaker in the installed position comprises receiving a front face of the circuit breaker between the first and second side rails such that the first side rail engages a first side surface of the front face and the second side rail engages a second side surface of the front face.

15. The method of claim 14 wherein:

the adapter comprises a lower rail at the rear portion that is perpendicular to the first and second side rails;

installing the adapter on the circuit breaker in the installed position comprises engaging a lower surface of the front face with the lower rail.

16. The method of claim 15 further comprising:

aligning the adapter in a first direction in the installed position using the first and second side rails; and aligning the adapter in a second, perpendicular direction in the installed position using the lower rail.

17. The method of claim 14 wherein:

the adapter comprises an upper rail at the rear portion that is perpendicular to the first and second side rails;

installing the adapter on the circuit breaker in the installed position comprises engaging the front face with the upper rail;

the method further comprises blocking ambient light with the adapter in the installed position using the first side rail, the second side rail, the lower rail, and/or the upper rail.

18. The method of claim 13 wherein:

the circuit breaker comprises a test button on the front face;

the method further comprises actuating the test button with the adapter in the installed position.

19. An adapter for receiving operational data from a circuit breaker, the adapter comprising:

a housing having a front portion and a rear portion, the rear portion comprising first and second spaced apart side rails that are configured to engage first and second sides of a circuit breaker or first and second side surfaces of a front face of the circuit breaker to hold the adapter in an installed position on the circuit breaker optionally with a friction fit, wherein the adapter is configured to receive light from the circuit breaker to receive operational data from the circuit breaker in the installed position.

20. The adapter of claim 19 wherein the adapter is configured to wirelessly communicate the operational data to an electronic device.

* * * * *